United States Patent [19]

Nozoe et al.

[11] Patent Number: 4,638,358

[45] Date of Patent: Jan. 20, 1987

[54] SAMPLING CLOCK REPRODUCING CIRCUIT

[75] Inventors: Toshiro Nozoe, Yamatokouriyama; Akira Yamashita, Takatsuki, both of Japan

[73] Assignee: Matsushita Electric Industrial Co., Ltd., Kadoma, Osaka, Japan

[21] Appl. No.: 515,256

[22] Filed: Jul. 19, 1983

[30] Foreign Application Priority Data

Jul. 19, 1982 [JP] Japan .................. 57-126379
Jul. 19, 1982 [JP] Japan .................. 57-126380
Feb. 2, 1983 [JP] Japan .................. 58-16471

[51] Int. Cl.⁴ .................................. H04N 5/04
[52] U.S. Cl. ........................... 358/147; 358/148
[58] Field of Search ............ 358/147, 25, 19, 20, 358/148, 150, 158, 28; 329/124; 331/11, 20, 1 R, 10, 12; 375/110, 119, 45, 118; 307/511, 512, 529

[56] References Cited

U.S. PATENT DOCUMENTS 3,008,094 11/1961 Trimmer .................. 331/45
3,755,617 8/1973 Ichida .................. 358/28
4,051,519 10/1977 Harwood ............... 358/28
4,202,012 5/1980 Hirashima .............. 358/20

FOREIGN PATENT DOCUMENTS

0126250 11/1978 Japan .................. 331/1 R
0093347 7/1980 Japan .................. 375/119
0093351 7/1980 Japan .................. 375/118
0097247 6/1984 Japan .................. 375/118

Primary Examiner—Tommy P. Chin
Assistant Examiner—David E. Harvey
Attorney, Agent, or Firm—Wenderoth, Lind & Ponack

[57] ABSTRACT

A sampling clock reproducing circuit which reproduces the sampling clock for sampling character data signals from the teletext signal superposed on the vertical blanking period of television signal, which has a gate for passing signals in the vicinity of clock run-in signals, a band-pass filter, a self-excited oscillator, phase comparison circuits for comparing the band-pass filter with the self-excited oscillator in the phase of output thereof, and an oscillation output circuit comprising a phase-shift circuit controlled by the outputs of the phase comparison circuits.

9 Claims, 13 Drawing Figures

$V_2 \leqq V_3 < V_1$

SAMPLING CLOCK REPRODUCING CIRCUIT

BACKGROUND OF THE INVENTION

1. Field of the Invention

This invention relates to a sampling clock reproducing circuit for reproducing data sampling clock signals, which is used in a teletext receiver for reading out the information (including character and picture data and to be hereinafter called the teletext signal) superposed on the television signals in a predetermined horizontal scanning period.

2. Description of the Prior Art

The character data signals in the teletext broadcast system are binary NRZ signals of a data packet form in one horizontal scanning period (1H) and superposed on one to several desired Hs in the vertical blanking period of video signal.

Figure 1:
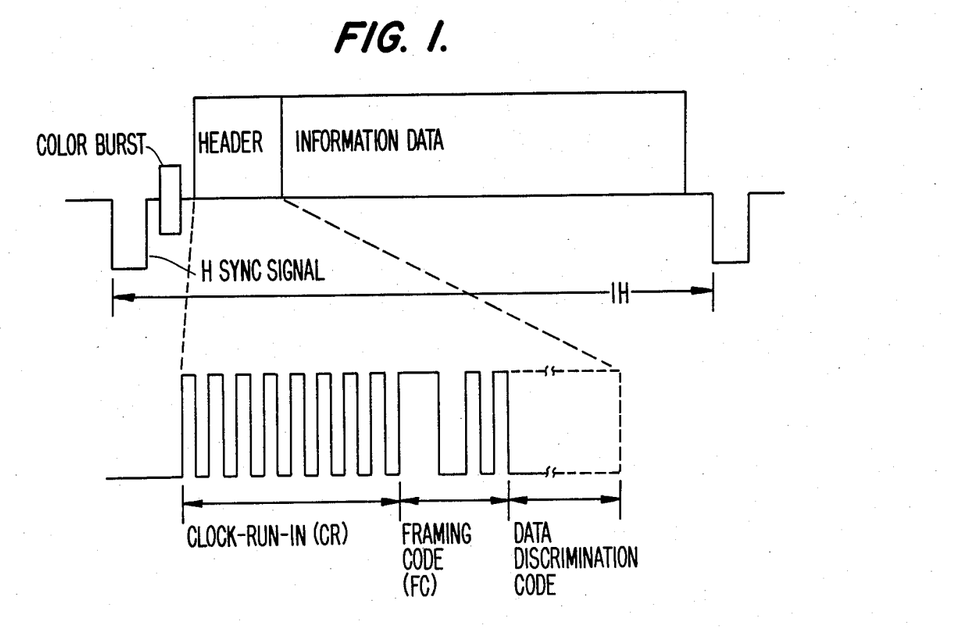
FIG. 1 is a wave form chart of a teletext data signal superposed on a television signal.

FIG. 1 is a wave form chart exemplary of a superposed character data signal (the data packet), in which the character data signal comprise header and information data, the header including clock-run-in signal framing code signal and data discrimination code signal, the clock-run-in signal being the synchronizing signal for reproducing the data sampling clock signal (to be hereinafter abbreviated to the sampling clock), the framing code signal being for synchronizing the data packet.

Now, in the teletext broadcast system, the character signal in FIG. 1 is transmitted and then reproduced at the receiving side. The receiving side needs reproduce the sampling clock accurately for sampling the subsequent signals on the basis of clock-run-in signal. The frequency of sampling clock is different in the system of every country, but equal to two times the fundamental frequency of clock-run-in signal, which is prescribed in Japan to 5.73 MHz ($=364 \, f_H=(3/5)\cdot f_{sc}$, where $f_H$: frequency of horizontal synchronizing pulse, $f_{sc}$: frequency of chrominance subcarrier. The Japanese system will be described below.

It is necessary for reproduction of sampling clock to set the frequency to 5.73 MHz and simultaneously coincide the phase with the clock-run-in signal. Since the jitter in the sampling clock, when the SN ratio of the input signal deteriorates, has a large influence on the reproduction of the input data, the jitter should be restricted even when the SN ratio deteriorates.

An example of conventional sampling clock reproducing circuit used for solving the above problems will be described below.

The teletext signal in the vicinity of the clock-run-in signal is sampled through a band-pass filter of 2.86 MHz and a gate circuit and doubled, and thereafter passes through a band-pass filter of 5.73 MHz, so that an output thereof drives a ringing oscillator to generate the preliminary sampling clock, which is used for framing code detection in order to synchronizing the frame. On the other hand, the main sampling clock divides the signal of frequency of n times 5.73 MHz (e.g. five times=28.6 MHz) into 1/n by a counter. The preliminary sampling clock samples the teletext signal, and the framing code obtained after error-correction resets the counter, thereby obtaining a proper sampling clock synchronized in phase. Such a conventional system is very complicated.

Since the high frequency of 28.6 MHz is divided during the oscillation at five times larger than 5.73 MHz, the high harmonic generated at that time gets in an antenna, so that in some cases the error rate largely increases with respect to the reception from a particular station. For example, while the 9th channel in Japan has the video carrier frequency of 199.25 MHz, the high harmonic of seven times 28.6 MHz is of 200.2 MHz, so that the beat signal of about 1 MHz is produced to largely affect the data reproduction.

The sampling clock, even when phase-synchronized with the clock-run-in signal, needs be phased through a phase-shift circuit corresponding to the circuit constitution of sampling clock reproduction system and to that of data slice system. Also, the teletext data signal, which is an intermittent signal for 1 to several Hs per one field, is defective in that its phasing is difficult to adjust.

Figure 11:
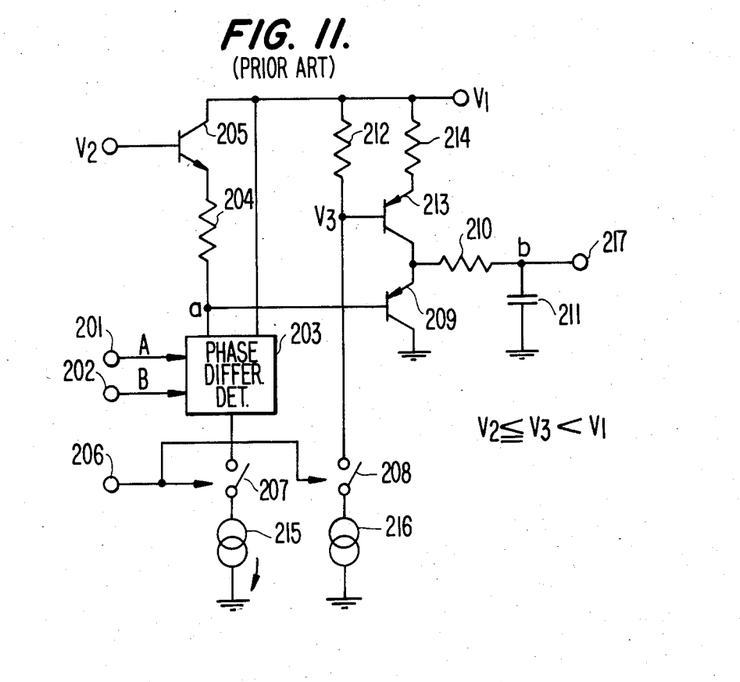
FIG. 11 is a circuit diagram of a conventional phase comparison circuit.

Next, FIG. 11 is a circuit diagram exemplary of a conventional phase-comparison circuit, in which reference numerals 201 and 202 designate input terminals for signals A and B to be phase-compared, and 203 designates a phase difference detection circuit. Resistor 204 is a load resistor to the phase difference detection circuit 203, a transistor 205 is an emitter follower transistor to keep supply voltage to the load resistance 204 $V_2-V_{BE}$ (where $V_{BE}$: voltage across the base and the emitter of transistor 205, of about 0.7 V). 206 designates an input terminal given gate pulse to turn on switches 207 and 208 for the phase difference detecting time period, the switches 207 and 208 operating in association with each other. Voltage variation at the node a for the period of turning on the switches 207 and 208 to detect a phase difference between the signals A and B is transmitted to a capacitor 211 through a transistor 209 and a resistor 210, a resistor 212 determining the base bias voltage of transistor 213, a resistor 214 determining a bias current for transistors 213 and 209, and 215 and 216 designate current sources respectively.

When switches 207 and 208 are off after phase detection, the base voltage of transistor 209 is $V_2-V_{BE}$ and that ($V_3$) of transistor 213 is $V_1$. In case that $V_2-V_{BE}$ is designed to be higher than the maximum voltage developed at capacitor 211, the transistor 209 is off and the transistor 213 also is of equal voltage ($V_1$) across the base and emitter so as to be off. Hence, upon turning the switches 207 and 208 off, voltage of capacitor 211 is held, which is output as the phase difference detection voltage from the output terminal 217.

Figure 12:
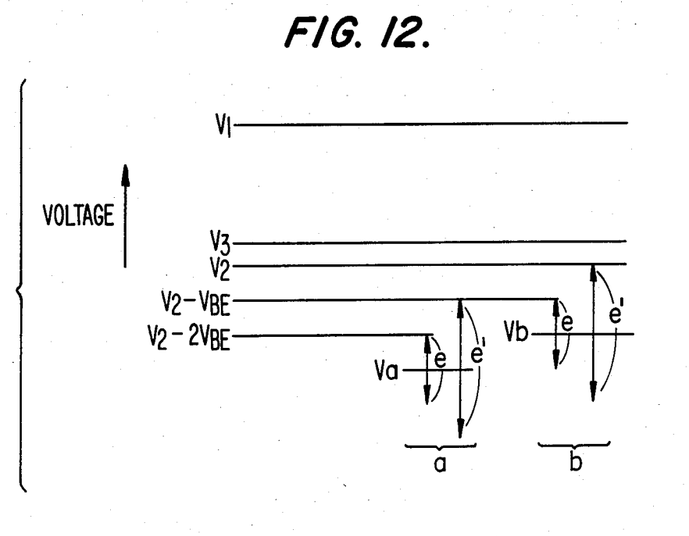
FIG. 12 is a view of the voltage relation explanatory of operation of the phase comparison circuit in FIG. 11.

FIG. 12 shows the voltage relation between the FIG. 11 circuit and the FIG. 13 circuit to be discussed below. In FIG. 12, $V_a$ and $V_b$ are mean DC voltages at the nodes a and b respectively and e is a variation in phase difference detection voltage, the variations e at the nodes a and b being equal because the transistor 209, when on, operates as the emitter follower. The voltage difference between $V_b$ and $V_a$ is $V_{BE}$ (where $V_{BE}$: voltage across the base and emitter of transistor 209). When a current flowing in the current source 215 is assumed 2 $I_1$, the mean current of $I_1$ flows in the load resistor 204 connected to one output at the phase difference detection circuit 203.

Accordingly, a resistance value of resistor 204 is represented by $R_1$, $V_a$ is given by the following equation:

$$V_a = V_2 - V_{BE} - I_1 R_1 \tag{1}$$

In order to completely turn off the transistor 209 for the holding period as aforesaid, the variation at the node b should not be higher than $V_2-V_{BE}$ as shown by the dotted line in FIG. 12. Hence, the maximum value of variation of voltage at the node a becomes to be restricted by $V_2-2V_{BE}$. In case of switching operation, the variation reaches the maximum value $V_2-V_{BE}$ so that voltage at the node b rises up to $V_2$, but when the switches 207 and 208 are off, the base voltage at transistor 209 rises only to $V_2-V_{BE}$, whereby the transistor 209 is not off and voltage of capacitor 211 drops to make it impossible to hold normal voltage. As a result, the dynamic range of phase comparison circuit should be restricted for use.

SUMMARY OF THE INVENTION

An object of the invention is to provide a sampling clock reproducing circuit which is simple in construction; even when the SN ratio of input signal deteriorates, realizes the data reproduction of less jitter or less error; needs no digital processing like frequency division; reproduces the sampling clock by the analog processing at the signal transfer rate even in the maximum frequency to thereby reduce interference with an antenna; and facilitates the phasing with sliced data.

Another object of the invention is to allow a phase comparison circuit to operate to completely cut off its system and eliminate variation in hold voltage and enlarge the dynamic range of a phase difference detection circuit.

The sampling clock generating circuit of the invention has a self-excited oscillator, detects by the phase comparison circuit a phase difference between an oscillation output of the oscillator and an output signal of a band-pass filter, and phase-shifts the oscillation output signal only to an extent of the phase difference through a phase-shift circuit, thereby reproducing the sampling clock which is phase-synchronized with the clock-run-in signal of the teletext signal and has the frequency stabilized for one horizontal scanning period, the phase comparison circuit detecting the phase difference between the two signals at a certain gating period to hold the detected voltage.

DESCRIPTION OF THE PREFERRED EMBODIMENT

Next, an embodiment of the invention will be detailed with reference to the drawings.

Figure 2:
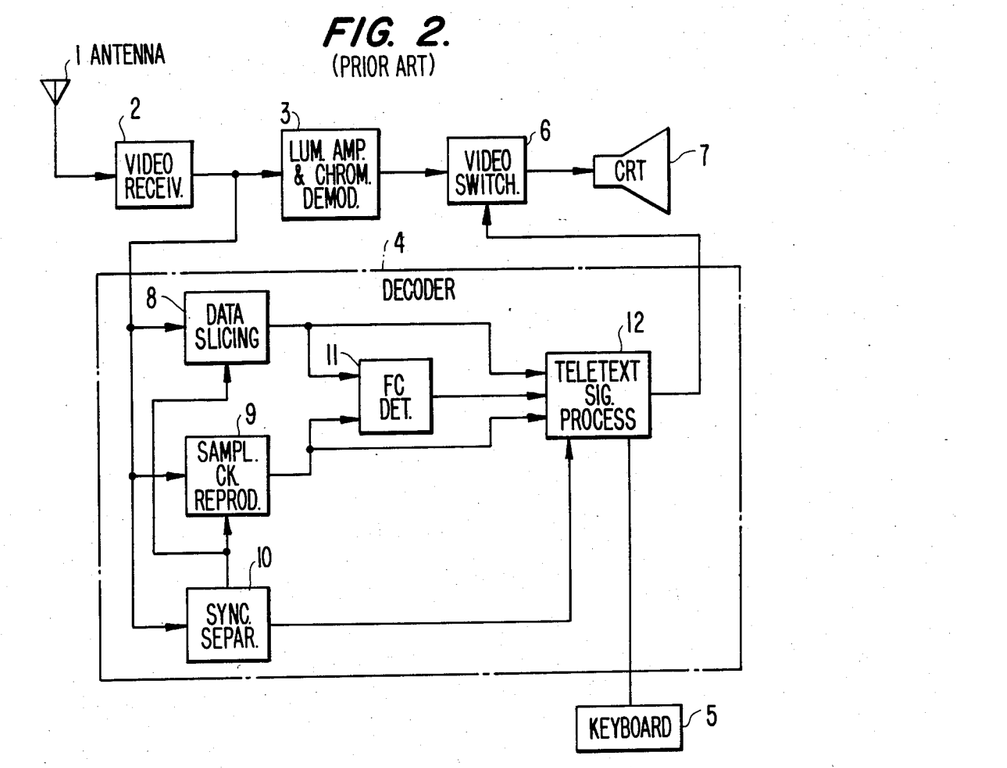
FIG. 2 is a block diagram exemplary of a teletext broadcast receiver as a whole.

FIG. 2 is a structural view of a teletext receiver as a whole, in which reference numeral 1 designates a receiving antenna, 2 designates a video receiving unit, 3 designates a luminance signal amplifier and chrominance demodulator, 4 designates a decoder for teletext signal, 5 designates a keyboard for assignment of a desired program, 6 designates a video switching unit for switching the television video signals on the reception and demodulated teletext signals, and 7 designates a cathode ray tube (CRT) to display the switched video signals.

In a decoder 4, reference numeral 8 designates a data slicing circuit for slicing the teletext. signals superposed on the video signal to reproduce the data, 9 designates a sampling clock reproducing circuit reproducing the sampling clock for reading the data, 10 designates a sync separator (at need including a horizontal automatic frequency control (AFC) and a horizontal oscillator), 11 designates a framing code detection circuit for detecting the framing code (FC), and 12 designates a teletext signal processing circuit which reads in data sliced after FC detection and stores the obtained data in a memory to output it as the signal which can be displayed by CRT.

Figure 3:
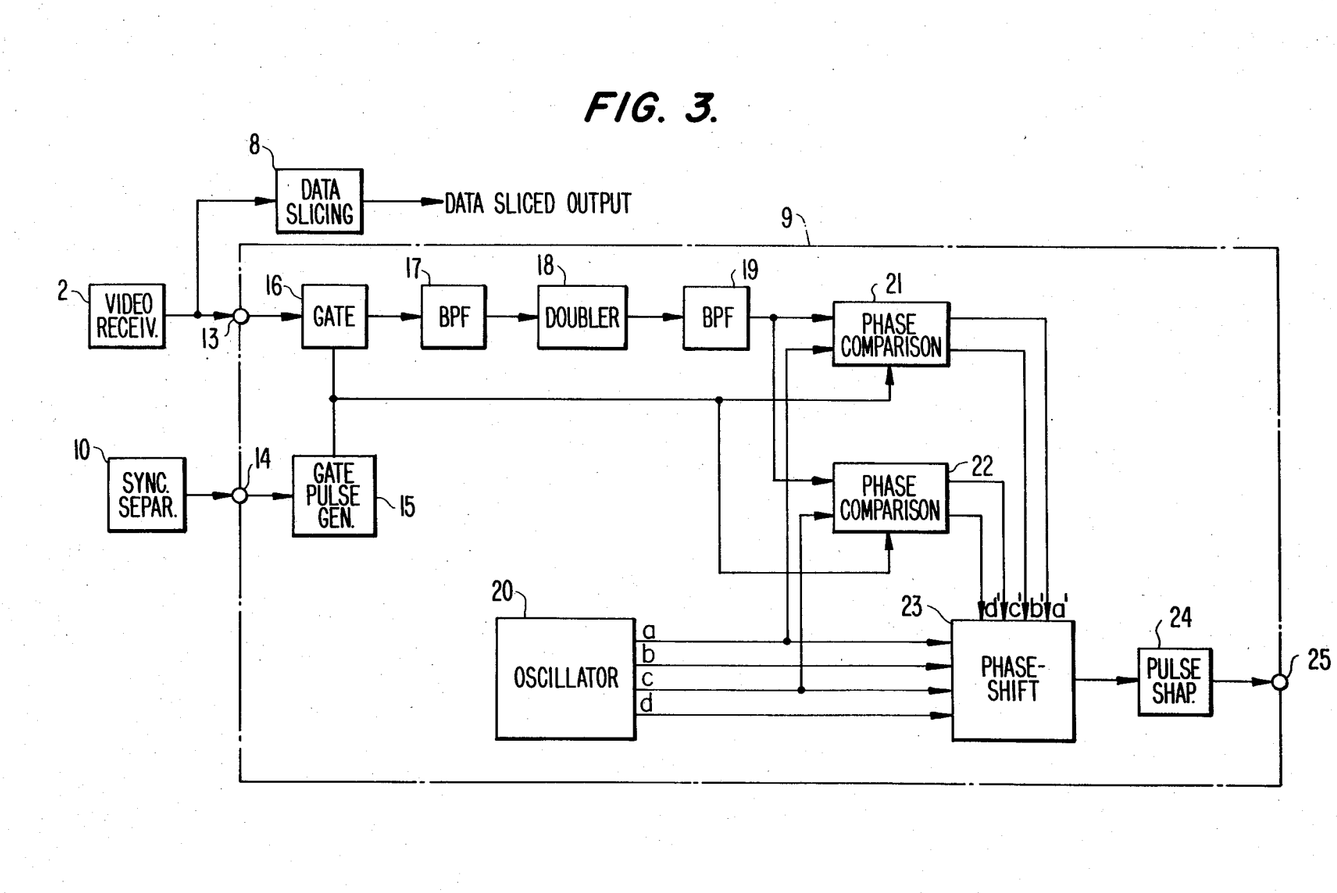
FIG. 3 is a block diagram of an embodiment of a sampling clock reproducing circuit of the invention.

FIG. 3 is a further detailed structural view of an embodiment of the sampling clock reproducing circuit of the invention, in which the blocks coincident with those in FIG. 2 are designated by the same reference numerals respectively. In FIG. 3, reference numeral 13 designates an input terminal for the video signal on which the teletext data signal is superposed, 14 designates an input terminal for horizontal synchronizing pulse, 68 designates an output terminal for the reproduced sampling clock, and 15 designates a gate pulse generating circuit which generates gate pulse for gating the clock-run-in signal of character data signal, which circuit can be formed of a mono-multivibrator or the like on the basis of the horizontal synchronizing pulse given from the input terminal 14, the gate pulse being given to a gate circuit 16 to thereby sample the clock run-in signal component of the input signal from the input terminal 13. The sampled clock run-in signal passes through a band-pass filter 17 of 2.86 MHz to remove the noise component other than the repeated frequency of clock run-in signal. The output of band-pass filter 17 is converted by the resonance characteristic thereof into a sine wave form signal of 2.86 MHz in continuous vibration after the clock run-in signal period.

The frequency of the signal is doubled by a doubler circuit 18 and then passes through a band-pass filter 19 of 5.73 MHz, thereby obtaining an oscillation signal of 5.73 MHz frequency two times as large as the repeated frequency of clock run-in signal, where the doubler 18 is realizable by a multiplier which multiplies the same input signals each other.

In addition, it is difficult for band-pass filter 19 to output continuous sine wave signals for one horizontal scanning period.

Now, explanation in detail will be given on an oscillation output circuit comprising phase comparison circuits 21 and 22, an oscillator 20 and a phase-shift circuit 23.

Figure 4:
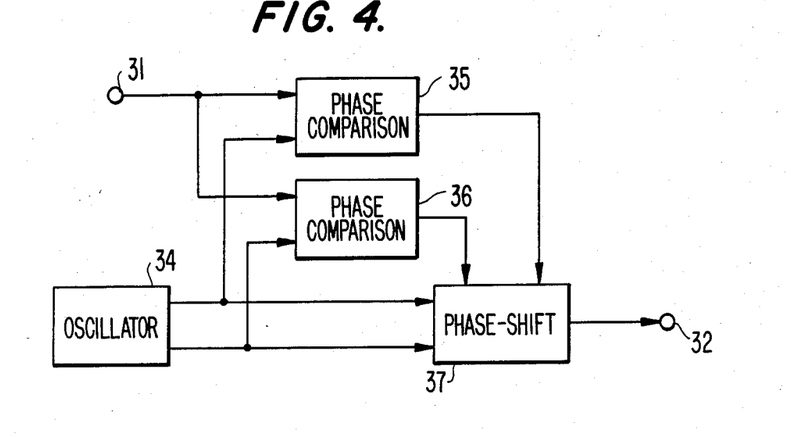
FIG. 4 is a block diagram showing the principle of an oscillation output circuit used in this invention.

Referring to FIG. 4, reference numeral 31 designates an input terminal for feeding an input signal, 32 designates an output terminal from which an output signal is taken out, 34 designates an oscillator circuit, 35 and 36 designate phase comparison circuits of the same constitutions, and 37 designates a phase-shift circuit.

The oscillator circuit 34 outputs two or more output signals different in phase from each other and gives them to the phase comparison circuits 35 and 36 and phase-shift circuit 37, where for simplification of explanation two output signals are assumed to be output from oscillator circuit 34 and have phases of 0° and 90° respectively and also coincident with the frequency of input signal, or very similar thereto. An error therebetween differs in the system, design or specification, of the invention, but, for example, is about $10^{-2}$ or less. The signal of phase 0° is given to the comparison circuit 35 and that of phase 90° to the comparison circuit 36.

On the other hand, the input signal given to the input terminal 31 is assumed to be the sine wave signal in continuation with time and of single frequency component, and is given to the phase comparison circuits 35 and 36, the phase comparison circuit 35 comparing phases of the input signal and signal of phase 0°, and that 35 comparing the phases of the same and signal of phase 90°, thereby outputting control signals corresponding to the phase difference between the respective two signals.

The phase-shift circuit 37 is given two signals of phase 0° and 90° from the oscillator circuit 34 and changes the mixing ratio of signals of phases 0° and 180° or the inverted signals thereto, that is, signals of phases 90° and 270°, corresponding to the control signals from the phase comparison circuits 35 and 36, thereby outputting from the output terminal 32 the sine wave signal of a certain phase, for example, the same phase as that of input signal. Such operation will be further detailed in accordance with FIG. 5 hereinafter. In addition, the phase comparison circuits 35 and 36 are obtainable by the well-known circuits and the concrete diagram thereof is omitted herein.

Operation of phase-shift circuit 37 is described by reference to the electrical vector diagram in FIG. 5, in which reference numeral 40 designates a vector of input signal, 41 designates that of signal of phase 0° in the output signal of oscillator circuit 34, 42 designates a vector of signal of phase 90°, 43 designates a vector of signal obtained by controlling the signal corresponding to vector 41 by the output control signal from the phase comparison circuit 35, 44 designates a vector of signal obtained by controlling the signal corresponding to vector 42 by the output control signal from the phase comparison circuit 36, and 45 designates the resultant vector of vectors 43 and 44, which shows the vector of output signal obtained at the output terminal 32. The phase-shift circuit 37 is given two signals of phases 0° and 90°, that is, those corresponding to the vectors 41 and 42, from the oscillator circuit 34 and converts them by two control signals from the phase comparison circuits 35 and 36, into signals corresponding to the vectors 43 and 44 and then composes said signals corresponding to the vector 40.

Figure 6:
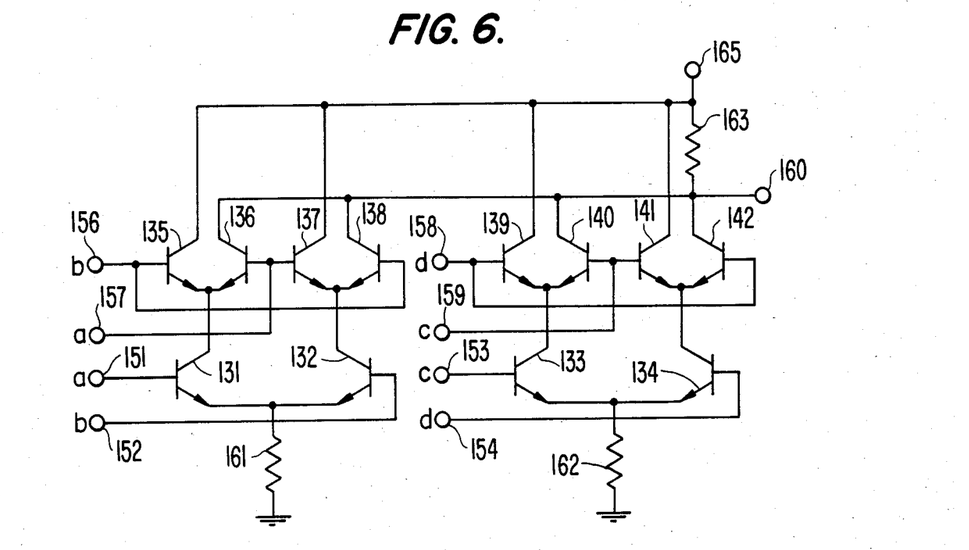
FIG. 6 is a connection diagram of a concrete example of a phase-shift circuit.

FIG. 6 is a circuit diagram exemplary of the phase-shift circuit 37, in which reference numerals 131 through 142 designate transistors, 151 through 154 and 156 through 159 designate input terminals for signals, 160 designates an output terminal, 161 and 162 designate emitter resistances, 163 designates a load resistance, and 165 designates a supply terminal for a DC power source, the transistors 131 and 132, 133 and 134, 135 and 136, 137 and 138, 139 and 140, and 141 and 142, forming differential amplifiers connected at the emitters respectively. These differential amplifiers can at need be emitter-connected through emitter resistances for stability and gain adjustment, but such connection is omitted from the drawing. Also, the bases of transistors 131 through 142 are applied with DC bias voltage by the well-known circuit, which is not shown.

Figure 5:
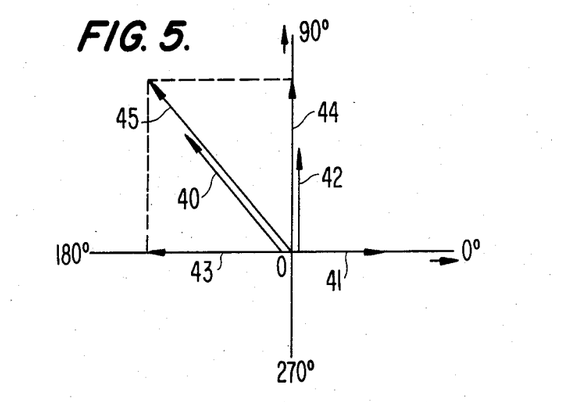
FIG. 5 is an electrical vector diagram explanatory of operation of the oscillation output circuit in FIG. 4.

The input terminals 151 and 153 are given with signals corresponding to the vectors 41 and 42 in FIG. 5, in other words, the signals of phases 0° and 90° from the oscillator circuit 34 in FIG. 4, the input signals being transmitted to the bases of transistors 131 and 133 respectively. The input terminals 152 and 154 are given with the signals of phases 180° and 270° from the oscillator circuit 134, which signals are transmitted to the bases of transistors 132 and 134 respectively. Since the transistors 131 and 132, and 133 and 134, form differential amplifiers having common emitter resistances 161 and 162, the input signals to the input terminals 152 and 154, according to the principle of operation, operate similarly even at the constant DC voltage. Anyway, when the above signals are given to the input terminals 151 through 154, signal currents of phases 0°, 180°, 90° and 270° flow in the collectors of transistors 131 through 134 and are fed to the emitters of transistors 135 and 136, 137 and 138, 139 and 140, and 141 and 142 respectively.

The input terminals 156 and 157 are given with the control signal from the phase comparison circuit 35 in FIG. 4, and those 158 and 159 given the control signal from the phase comparison circuit 36 in FIG. 4. When voltage fed to the input terminal 156 exceeds that to the input terminal 157, more than a half of collector current at the transistor 131 flows into the transistor 135, and a half or more of collector current at the transistor 132 flows into the transistor 138, the currents being transferred to the load resistance 163, whereby an output signal of phase 180° appears at the output terminal 160, which signal corresponds to the vector 43 in FIG. 5. Hence, the magnitude of vector 43 representing input signal changes corresponding to input voltage to the input terminals 156 and 157, thereby being the vector representing signal of phase 0° or 180° due to the relation of voltage level.

Quite similarly to the above, an output signal corresponding to the vector 44 in FIG. 5 appears at the output terminal 160 according to the magnitude relation of voltage given to the input terminals 138 and 159. Since the transistors 135 and 136, 137 and 138, 139 and 140, and 141 and 142, form the differential amplifiers, even when a fixed DC voltage is applied to the input terminals 157 and 159, the operation is not different. Since the load resistance 163 serves as the load on transistors 136, 138, 140 and 142, the outputs thereof are added and composed so that the output signal corresponding to the vector 45 in FIG. 5 is obtained at the output terminal 160.

The phase comparison circuits 35 and 36 each compare the phase of input signal given from the input terminal 31 with that of signal of phase 0° (or 180°) or 90° (or 270°) to thereby generate the signal in connection with the phase difference therebetween, for example, the proportional voltage, which is obtainable by the well-known technique. Also, the output may be one, or a pair obtained by use of proper differential amplifiers.

Figure 7:
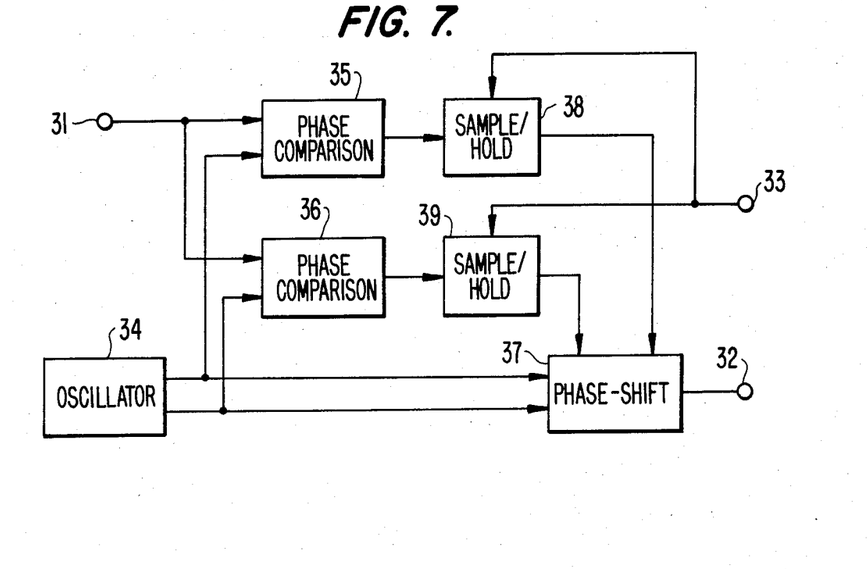
FIG. 7 is a block diagram of the oscillation output circuit of the invention, FIG. 8-(a), -(b), -(c) and -(d) are wave form charts of signals for the respective units in FIG. 7.
Figure 8:
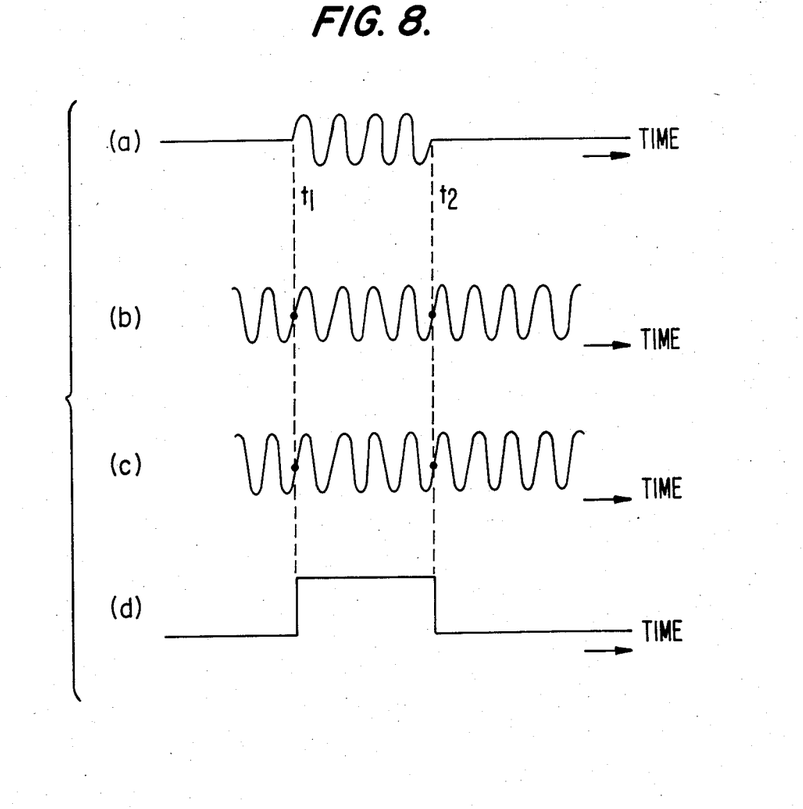

FIG. 7 is a block diagram of another example of the oscillation output circuit of the invention, in which the blocks coincident with those in FIG. 4 are designated by the same reference numerals. In FIG. 7, reference numerals 38 and 39 designate sample hold circuits, which are given from the phase comparison circuits 35 and 36 signals to be held and the outputs of which are connected to the phase-shift circuit 37, and 33 designates an input terminal for sampling pulse by which the period to sample-hold the signal is determined, the input terminal 33 being connected to the sample hold circuits 38 and 39. FIG. 8 shows wave form charts of signals at the principal portion for explanation of operation of the circuit in FIG. 7, in which the axis of abscissa represents the time.

Next, explanation in detail will be given on FIG. 7 together with FIG. 8.

FIG. 8-($a$) shows an input signal given to the input terminal 31 in FIG. 7. The input signal is the so-called burst signal, which samples only the period of the time from $t_1$ to $t_2$, from the sine wave signal having the single frequency as shown in FIG. 8-($b$). FIG. 8-($c$) shows the output signal, for example, of phase 0° from the oscillator circuit 34. FIG. 8-($d$) shows the sampling pulse given to the input terminal 33. In FIG. 7, the phase comparison circuit 35 is given from the input terminal 31 the signal shown in FIG. 8-($a$) and from the oscillator circuit 34 the signal shown in FIG. 8-($c$). These signals are phase-compared so that the signal corresponding to the phase difference therebetween is output from the phase comparison circuit 35 and transmitted to the sample hold circuit 38. Since the input terminal 33 is given with the sampling pulse shown in FIG. 8-($d$), the sampling hold circuit 38, only for the time of $t_1$ to $t_2$, transmits the signal from the phase comparison circuit 35 to the phase-shift circuit 37. Then, after the time $t_2$, the signal keeping the value at the time t2 is transmitted to the phase-shift circuit 37. Since the phase comparison circuit 35 is so designed that the time necessary to generate the control signal corresponding to the phase difference between the two input signals of the phase comparison circuit 35 is made shorter than the period of time from $t_1$ to $t_2$, the control signal at the time $t_2$ held by the sample hold circuit 38 is of value enough to output the desired signal at the output terminal of phase-shift circuit 37. The phase-comparison circuit 36 and sample hold circuit 39 operate quite similarly to the above, but this system controls the phase-shift circuit 37 as to the signal of phase 90° among the outputs of oscillator circuit 34. The phase-shift circuit 37 functions quite as the same as the phase-shift circuit 37 in FIG. 4, whereby at the output terminal 32 is obtained the signal in FIG. 8-($a$), that is, the signal equal in phase to that in FIG. 8-($b$).

The sampling clock generating circuit 9 in FIG. 3 has the oscillation output circuit in FIG. 7. The oscillator circuit 20 and phase-shift circuit 23 in FIG. 3 correspond to the oscillator circuit 34 and phase-shift circuit 37 in FIG. 7 respectively, the phase comparison circuits 21 and 22 corresponding to combination of the phase comparison circuit 35 with sample hold circuit 38 and to that of the phase comparison circuit 36 with sample hold circuit 39 in FIG. 7 respectively. In addition, the oscillator circuit 20 has the oscillation frequency of clock rate (e.g. 5.73 MHz) of the teletext signal and is preferable to use a quartz oscillator.

Again in FIG. 3, the oscillator circuit 20 generates four outputs of perpendicularly intercrossing phases at 0°, 180°, 90° and 270°, the four outputs being represented by a, b, c and d. The phase comparison circuits 21 and 22 which phase-compares the oscillation output of phase 0° with the output of band-pass filter 19 and that of phase 90° with the output of band-pass filter 19, so that when the circuits 21 and 22 comprise double-balanced type differential amplifiers, from which are output the phase difference detection signal with respect to the oscillation output of phase 0° and that of phase 180° and the same with respect to the oscillation output of phase 90° and that of phase 270°, these output signals being designated by a′, b′, c′ and d′ in FIG. 3.

In addition, since the output signal of band-pass filter 19 includes a clock run-in signal and signal in oscillation for some subsequent period, the phase comparison circuits 21 and 22 detect signal corresponding to the phase difference for the period of clock run-in signal and thereafter the period for the teletext signal holds the signal, the phase comparison being carried out only for the gate signal output period of gate pulse generating circuit 15 and thereafter held. In this case, the timing in FIG. 8-($a$) corresponds to the output signal of band-pass filter 19, and that in FIG. 8-($d$) corresponds to the output signal of gate pulse generating circuit 15.

The phase-shift circuit 23 comprises a circuit which controls the levels of oscillation outputs a, b, c and d of four phases of 5.73 MHz by the phase difference detection signals a′, b′, c′ and d′ and a circuit for vector-composing the respective controlled oscillation outputs, thereby enabling the use of the concrete circuit in FIG. 6. In other words, the oscillation output signals a, b, c and d from the oscillator circuit 20 are given to the input terminals 151, 152, 153 and 154 in FIG. 6 and the comparison output signals a′, b′, c′ and d′ from the phase comparison circuits 21 and 22 are given to the input terminals 157, 156, 159 and 158 respectively.

Now, a variation $i_1$ of collector current in the transistor 136 in FIG. 6 is in-phase with the oscillation output a and its level is controlled by the phase difference detection output a′. Similarly, a variation $i_2$ of collector current in the transistor 138 is in-phase with the oscillation output b and its level is controlled by the phase difference detection output b′, a variation $i_3$ of collector current in the transistor 140 is in-phase with the oscillation output c and its level is controlled by the phase difference detection output c′, and a variation $i_4$ of collector current in the transistor 142 is in-phase with the oscillation output d and its level is controlled by the phase difference detection output d′. These currents are composed to flow in the load resistance 163, in which the outputs at the respective phases are vector-composed, thereby being realizable of operation as the aforesaid phase-shift circuit 23 in FIG. 3.

In addition, in a case of connection of the above signals, the oscillation output a of phase 0° is controlled by the phase difference detection output a′ on the 0° axis, the oscillation output b of phase 180° is controlled by the phase difference detection output b′ on the 180° axis, the oscillation output c of phase 90° is controlled by the phase difference detection output c′ at the 90° axis, and the oscillation output d of phase 270° is controlled by the phase difference detection output d′ on the 270° axis, so that the phase of output of phase-shift circuit 23 becomes in-phase with the output signal of 5.73 MHz band-pass filter 19. Then, the output signal is shaped at a pulse shaping circuit 24, thereby obtaining at the output terminal 25 the sampling clock synchronized in phase with the clock run-in signal of character data signal.

It is desirable to put the sampling point of teletext signal at the center of the teletext signal, but in a case where the data and sampling clock are reproduced and the data is sampled by the sampling clock, since there is a difference in construction between the data slicing circuit, the phasing generally is required. In the phase-shift circuit 23, combination of the oscillation outputs (a, b, c and d) having the above four phases with the four phase difference detection outputs (a', b', c' and d') for controlling the levels of oscillation outputs, can shift the phase of output by 90° step. In other words, assuming that a-a', b-b', c'-c' and d-d' are the first combinations, the second combinations a-c', b-d', c-b', d-a' lead in phase by 90° with respect to the first combinations, the third combinations of a-b', b-a', c-d', d-c' lead in phase by 180° with respect to the first combination, the fourth combination of a-d', b-c', c-a' and d-b' by 270° with respect to the same. Accordingly, the selection of these combinations can carry out the phasing of slice data with sampling clock by 90° step without using a separate phase-shift circuit.

Furthermore, the precise phasing is possible by setting the tuning point of 5.73 MHz band-pass filter 19 to be shifted from 5.73 MHz. For example, if the band-pass filter 19 of 5.73 MHz is of the single-tuning type, the output amplitude is within −3 dB and the phase-shift by ±45° is possible, whereby the combination with phasing at 90° step enables the phasing across 360°.

Especially, in a case where the data slicing circuit and sampling reproducing circuit comprise the integrated circuit chip and two circuits are formed on one chip, variations in the relative phase between the slice data and the sampling clock become smaller, so that a special phase-shift circuit for phasing is not required, thereby enabling non-adjustment of phasing simultaneously with a low manufacturing cost.

In addition, in FIG. 3, the oscillation output of 5.73 MHz uses four phases of 0°, 90°, 180° and 270°, but the phases 0° and 180°, and 90° and 270°, are merely of reverse polarity, whereby the use of oscillation outputs and phase comparison outputs of 0° and 90° or 180° and 270° of course are realizable of the phasing as the same as the above.

Figure 9:
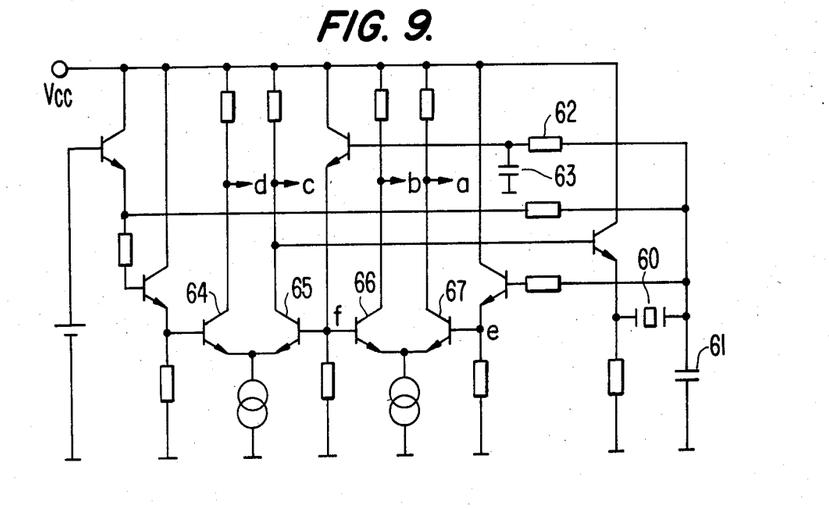
FIG. 9 is a concrete circuit diagram exemplary of an oscillation circuit used in the sampling clock reproducing circuit of the invention.
Figure 10:
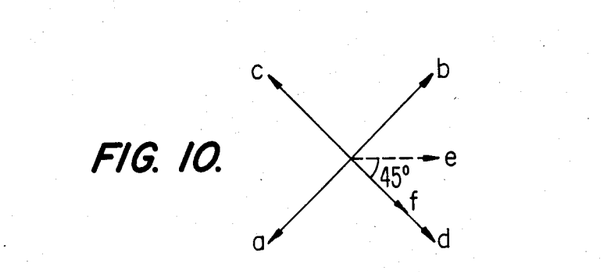
FIG. 10 is a vector diagram of an output signal from each unit in FIG. 9.

The oscillator circuit 20 of 5.73 MHz with four outputs phase-shifted by 90° each in FIG. 3 can be realized by the well-known oscillator used for the chroma demodulator in a television receiver as shown in FIG. 9, in which reference numeral 60 designates a quartz oscillator of 5.73 MHz, and 61 designates a capacitor connected in series therewith. Since the cutoff frequency of a circuit comprising a resistance 62 and a capacitor 63, is 5.73 MHz, the phase of 5.73 MHz signal lags at 45°. Hence, the phase relation between the nodes e and f in FIG. 9 is as shown in the vector diagram in FIG. 10. Assuming that the transistors 64, 65, 66 and 67 are of the same characteristic, when the bias condition is defined to equalize DC voltage at the base, the phase relation between the collector output a of transistor 67, that b of transistor 66, that c of transistor 65, and that d of transistor 64, can be represented by the vector diagram in FIG. 10 according to the principle of operation of differential amplifier.

Also, the use of quartz oscillator as in this circuit can restrict the shift of frequency below $10^{-4}$ in non-adjustment, so that a phase error caused by the frequency shift for one horizontal scanning period is very small, whereby the sampling clock of sufficient accuracy can be used in data read-in for one horizontal scanning period without constructing a closed loop, such as PLL, as the oscillator circuit.

Figure 13:
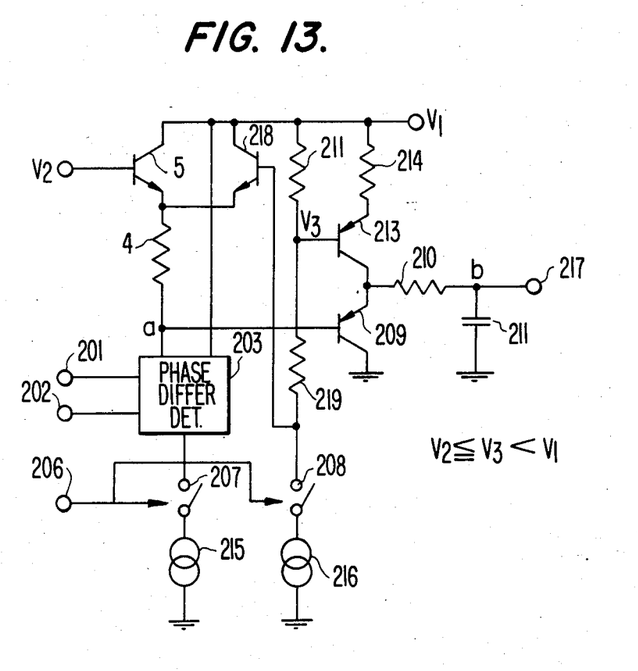
FIG. 13 is a circuit diagram of a phase difference comparison circuit of the invention.

Next, a concrete circuit diagram of the phase comparison circuits 21 and 22 of the invention is shown in FIG. 13, in which the blocks coincident with those in FIG. 11 are designated by the same reference numerals as in FIG. 11. In FIG. 13, a transistor 218 is a switching transistor which is on at the period (hold period) of turning the switches 207 and 208 off to thereby raise voltage at the node a higher than $V_2$. In this case, if a voltage drop caused by a base current is neglected, voltage at the node a for the hold period is $V_1 - V_{BE}$. Resistor 219, during the period (hold period) of turning the switches 207 and 208 off, feeds to the base of transistor 218 a current to turn it on as aforesaid, and during the period (phase difference detection period) of turning the switches 207 and 208 on, makes the base voltage of transistor 218 lower than $V_2$ to turn off it. Here, when an output current of current source 216 is represented by $I_2$ and resistance value of resistor 219 by $R_2$, the base voltage of transistor 218, when the switches 207 and 208 are on, becomes $V_3 - I_2R_2$. For turning off the transistor 218, $V_3 - I_2R_2$ is enough to be lower than $V_2$ by 500 mV or more. The transistor 218 and resistor 219 are added, so that the variation of voltage at the node a becomes $V_2 - V_{BE}$ as shown in the arrow of solid line in FIG. 12, so the maximum variation at the node b becomes $V_2$, but voltage at the node a for the hold period is $V_1 - V_{BE}$ and can be made higher than $V_2$, whereby the transistor 209 is completely off. Also, the transistor 213 is off as described in FIG. 11, so that voltage of capacitor 211 is properly held without lowering. Also, the dynamic range of phase difference detection, as shown in FIG. 12, can be expanded by 2 $V_{BE}$ (=1.4 V) in a P-P value as compared with the conentional example in FIG. 11.

In addition, the relation between voltages $V_1$, $V_2$ and $V_3$, which is common to FIGS. 11 and 13, should satisfy the following relation: At first, when a bias current flowing in transistors 213 and 209 is represented by $I_3$ and a resistance value of resistor 214 by $R_3$, the relation between $V_1$ and $V_3$ is given by $$V_3 = V_1 - I_3R_3 - V_{BE} \qquad (2)$$

Also, regarding the relation between $V_3$ and $V_2$ the following formula should hold because of the condition that the transistor is not saturated even when voltage at the node b changes to a maximum:

$$V_2 \leq V_3 \qquad (3)$$

From equations (2) and (3), $$V_2 \leq V_1 - I_3R_3 - V_{BE} < V_1 - V_{BE} \qquad (4)$$

is obtained, whereby $V_1 - V_{BE} \geq V_2$ also is ensured by being designed to satisfy the equations (2) and (3).

As seen from the above, the sampling clock reproducing circuit of the invention is advantageous in that (1) there is no need of switching sampling clock generating circuits with respect to the data component up to the framing code and subsequent thereto, whereby the sampling clock reproducing circuit simple in construction is realizable, (2) removal of noise component by use of two first and second filter with respect to the input signals can reproduce sampling clock of less jitter or less reception error even when the SN ratio in the input signal deteriorates (3) since there is no need of digital processing, such as frequency division from high oscillation frequency, the circuit operates by the analog process of frequency of transmission rate even in the highest frequency to thereby generate less distrubance wave from this circuit to the exterior, thereby also reducing the reception error, (4) the phase-shift circuit for phasing the slice data with the sampling clock necessary for sampling the slicing data with the proper timing by the sampling clock, can be omitted, (5) the phase comparison circuit can be realized which is relatively comparison circuit can be realized which is relatively simple in construction, free from fluctuation of hold voltage, and wide in dynamic range, and (6) the circuit apparatus can be provided which is most suitable to the integrated circuit limited in the number of pins of IC, because the phase-shift circuit is constructed without using many parts, such as capacitors or coils.

While the form of embodiment of the invention as herein described constitutes a preferred form, it is to be understood that other forms might be adopted, all coming within the scope of claims which follows.

What is claimed is:

1. A sampling clock reproducing circuit for teletext receiver comprising: a gate circuit for passing a clock-run-in signal included in a teletext signal; a first band-pass filter connected to said gate circuit and having a tuning frequency which is equal to a repeated frequency of said clock-run-in signal; a doubler circuit for doubling the frequency of an output signal of said band-pass filter; a second band-pass filter connected to said doubler circuit and having a tuning frequency which is about two times as large as the repeated frequency of said clock-run-in signal; an oscillator circuit oscillating at a frequency two times as large as the repeated frequency of said clock-run-in signal; phase comparison circuits each detecting a phase difference between a respective one of output signals of said oscillator circuit and an output signal of said second band-pass filter; and a phase-shift circuit which is given said output signals of said oscillator circuit and selectively mixes said output signals of said oscillator circuit with a changing mixing ratio therebetween in accordance with output signals of said phase comparison circuits, so that a sampling clock signal is reproduced from an output signal of said phase-shift circuit.

2. A sampling clock reproducing circuit according to claim 1, wherein said phase-shift circuit comprises two or more pairs of double balanced type differential amplifiers including a common output load.

3. A sampling clock reproducing circuit according to claim 1, wherein said phase comparison circuits each have a phase difference detection circuit which detects said phase difference and produces a reference voltage at one end of a load resistor connected to a constant voltage source, a first circuit which receives said reference voltage by an emitter follower circuit having an emitter connected to a constant current source so that said reference voltage given to a base of said emitter follower circuit is transmitted to a capacitor connected to the emitter of the same, a second circuit which cuts off the constant current source to said first circuit for a holding period after phase detection and converts said reference voltage into an output voltage of said constant voltage source, and a third circuit which level-shifts the output voltage of said constant voltage source so that said emitter follower circuit is completely cut off.

4. A sampling clock reproducing circuit for teletext receiver comprising:
   a gate circuit for passing a clock-run-in signal included in a teletext signal;
   a first band-pass filter connected to said gate circuit and having a tuning frequency which is equal to a repeated frequency of said clock-run-in signal;
   a doubler circuit for doubling the frequency of an output signal of said first band-pass filter;
   a second band-pass filter connected to said doubler circuit and having a tuning frequency which is about two times as large as the repeated frequency of said clock-run-in signal;
   an oscillator circuit oscillating at a frequency two times as large as the repeated frequency of said clock-run-in signal and generating two or more output signals of different phases from each other;
   two or more phase comparison circuits each detecting a phase difference between a respective one of said two or more output signals of said oscillator circuit and an output signal of said second band-pass filter; and
   a phase-shift circuit which is given said two or more output signals of said oscillator circuit and selectively mixes said two or more output signals of said oscillator circuit with a changing mixing ratio therebetween in accordance with output signals of said two or more phase comparison circuit, so that a sampling clock signal is reproduced from an output signal of said phase-shift circuit.

5. A sampling clock reproducing circuit according to claim 4, wherein said phase-shift circuit comprises two or more pairs of double balanced type differential amplifiers including a common output load.

6. A sampling clock reproducing circuit according to claim 4, wherein said phase comparison circuits each has a phase difference detection circuit which detects said phase difference and produces a reference voltage at one end of a load resistor connected to a constant voltage source, a first circuit which receives said reference voltage by an emitter follower circuit having an emitter connected to a constant current source so that said reference voltage given to a base of said emitter follower circuit is transmitted to a capacitor connected to the emitter of the same, a second circuit which cuts off the constant current source to said first circuit for a holding period after phase detection and converts said reference voltage into an output voltage of said constant voltage source, and a third circuit which level-shifts the output voltage of said constant voltage source so that said emitter follower circuit is completely cut off.

7. A sampling clock reproducing circuit for teletext receiver comprising:
   a gate circuit for passing a clock-run-in signal included in a teletext signal;
   a first band-pass filter connected to said gate circuit and having a tuning frequency which is equal to a repeated frequency of said clock-run-in signal;
   a doubler circuit for doubling the frequency of an output signal of said first band-pass filter;
   a second band-pass filter connected to said doubler circuit and having a tuning frequency which is about two times as large as the repeated frequency of said clock-run-in signal;

an oscillator circuit oscillating at a frequency two times as large as the repeated frequency of said clock-run-in signal and generating two or more output signals of different phases from each other;

two or more phase comparison circuits each detecting a phase difference between a respective one of said two or more output signals of said oscillator circuit and an output signal of said second bandpass filter;

two or more sample hold circuits connected to said two or more phase comparison circuit, respectively, for sampling and holding output signals of said two or more phase comparison circuit, respectively; and a phase-shift circuit which is given said two or more output signals of said oscillator circuit and selectively mixes said two or more output signals of said oscillator circuit with a changing mixing ratio therebetween in accordance with output signals of said two or more sample hold circuits, so that a sampling clock signal is reproduced from an output signal of said phase-shift circuit.

8. A sampling clock reproducing circuit according to claim 7, wherein said phase-shift circuit comprises two or more pairs of double balanced type differential amplifiers including a common output load.

9. A sampling clock reproducing circuit according to claim 7, wherein said phase comparison circuits each have a phase difference detection circuit which detects said phase difference and produces a reference voltage at one end of a load resistor connected to a constant voltage source, a first circuit which receives said reference voltage by an emitter follower circuit having an emitter connected to a constant current source so that said reference voltage given to a base of said emitter follower circuit is transmitted to a capacitor connected to the emitter of the same, a second circuit which cuts off the constant current source to said first circuit for a holding period after phase detection and converts said reference voltage into an output voltage of said constant voltage source, and a third circuit which level-shifts the output voltage of said constant voltage source so that said emitter follower circuit is completely cut off.

* * * * *